United States Patent [19]

Sysolin et al.

[11] 4,371,004
[45] Feb. 1, 1983

[54] AUTOMATIC COUPLING DEVICE TO CONNECT TRACTOR AND TRACTOR-DRAWN MEANS HYDRAULIC SYSTEMS

[76] Inventors: Petr V. Sysolin, prospekt Pravdy, 60, kv. 25; Ivan I. Zaitsev, prospekt Pravdy, 6, kv. 12; Gary M. Pekerman, ulitsa Ufimskaya, 15, kv. 71; Jury P. Kurzov, prospekt Pravdy, 3, kv. 31; Alexandr E. Tompakov, ulitsa 50 let Oktyabrya, 11, kv. 35; Valery A. Maljuchenkov, ulitsa Volkova, 18, kv. 90; Alexandr S. Kabachenko, pereulok Spusknoi, 12, all of Kirovograd, U.S.S.R.

[21] Appl. No.: 187,993

[22] Filed: Sep. 17, 1980

[51] Int. Cl.³ .............................. F16L 37/28
[52] U.S. Cl. ............................ 137/899; 137/614.04; 285/9 R; 285/306; 251/149.7
[58] Field of Search ................ 137/494, 614, 614.01, 137/614.06, 899, 614.04; 285/9 R, 306; 251/149.7, 149.8

[56] References Cited

U.S. PATENT DOCUMENTS 2,625,168  1/1953  Charlson ................ 137/614.01
2,887,124  5/1959  Mehl ........................ 285/306
3,233,549  2/1966  Howe ....................... 285/9 R
3,326,579  6/1967  Fowler ..................... 285/9 R
3,826,522  7/1974  Dowes ...................... 285/9 R

FOREIGN PATENT DOCUMENTS 827116 of 0000 U.S.S.R. .
2326060 of 0000 U.S.S.R. .

Primary Examiner—A. Michael Chambers
Attorney, Agent, or Firm—Fleit & Jacobson

[57] ABSTRACT

An automatic coupling device to connect a hydraulic system tractor and a tractor-drawn device hydraulic system comprises a panel secured on the tractor-drawn device and a body mounted on the tractor. The panel accommodates receiving unions with shut-off valves. The body has blind bores accommodating hollow plungers each fitted with a shut-off valve at the end face operatively engaging the union. In each of the bores, the corresponding the plunger defines a bottom chamber, the bottom chambers communicating with each other and with a branch of a pressure port provided in the body. An aperture is provided in the side wall of one of the plungers, at the end face opposite to that operatively engaging the union, to communicate the hollow of this plunger with the pressure port, and a similar aperture is provided in the side wall of the other plunger to communicate its hollow with a drain port provided in the body.

4 Claims, 8 Drawing Figures

AUTOMATIC COUPLING DEVICE TO CONNECT TRACTOR AND TRACTOR-DRAWN MEANS HYDRAULIC SYSTEMS

BACKGROUND OF THE INVENTION

1. Field of the Invention

The present invention relates to the field of agricultural engineering and is specifically concerned with automatic coupling devices to connect the hydraulic system of a tractor with that of a tractor-drawn means.

The invention may be used to connect the hydraulic system of a tractor with the hydraulic dump cylinder of a dump trailer or with the actuating hydraulic cylinder of a self-contained loader on a trailer.

The invention may be employed to the best advantage to connect the hydraulic systems of a tractor and of a drill, a cultivator, or another hydraulically-operated agricultural machine.

2. Description of the Prior Art

The problem of a reliable automatic coupling of the tractor and tractor-drawn means hydraulic systems without complicating the construction of the coupling device remains yet to be adequately solved.

There has been proposed, for example, an automatic coupling device which has unions, provided with seals, to be brought into an operative engagement (USSR Inventor's Certificate No. 178,251, Int. Cl.$^2$ F 16L 37/04, published Mar. 26, 1963).

This device has no shut-off members, in particular shut-off valves, in the unions and is thus not protected against fouling, which impairs its operational dependability.

The closest in the technical concept to the present invention is an automatic coupling device to connect the tractor and tractor-drawn means hydraulic systems, disclosed in the USSR Inventor's Certificate No. 580,993 (Int. Cl.$^2$ B60D 7/04, published Jan. 25, 1977), which comprises a panel with receiving unions, mounted on the tractor-drawn means, and a body with hollow plungers movable in corresponding bores in the body mounted on the tractor. Each plunger partly extends out of the bore in the body and defines by one of its end faces a bottom chamber below the plunger in the bore. The operatively engaging end faces of the hollow plungers and of the receiving unions are fitted with spring-loaded shut-off ball valves. The bottom chambers are intercommunicated, and the hollow of each of the plungers communicates via a union in the side wall of the plunger portion extending out of the bore with the pressure or the drain line of the tractor hydraulic system, the bottom chambers periodically communicating via spring-loaded check valves carried by the plungers with the hollow of one or another plunger.

The shut-off valves provided in this device on the operatively engaging end faces of the plungers and of the receiving unions protect the device and the hydraulic system from fouling, but the provision of the spring-loaded check valves inside the plungers complicates the construction of the device and its operation, since the effort of the check valve springs must be accurately calibrated to conform with the working pressure of the fluid in the hydraulic system. Moreover, an accidental pressure drop in the hydraulic system due to a fluid leak through a check valve may cause the engaged parts of the device to disconnect from each other, which is particularly undesirable when the tractor hydraulic system is connected to that of a hoisting means. The above drawbacks greatly impair the operational dependability of the device.

The present invention has as its aim to provide an automatic coupling device which, owing to a separate fluid feed into the bottom chamber and into the plunger hollow, ensures a reliable connection of the tractor and tractor-drawn means hydraulic systems.

SUMMARY OF THE INVENTION

The principal object of the present invention is to provide an automatic coupling device which ensures a reliable connection of the tractor and tractor-drawn means hydraulic systems.

Another, not less important, object of the invention is to simplify the construction of the device.

The above-mentioned objects are attained by that in an automatic coupling device to connect the tractor and tractor-drawn means hydraulic systems which comprises, on the tractor-drawn means, a panel accommodating receiving unions with shut-off valves, and on the tractor, a body with hollow plungers each fitted with a shut-off valve at the end face to be brought into an operative engagement with a union, each movable in the corresponding blind bore in the body, and each defining a bottom chamber in the bore below the plunger, the bottom chambers being intercommunicated, the hollow of one of the plungers communicating via an aperture in the side wall thereof with a pressure port, and the hollow of the other plunger, also via an aperture in the side wall thereof, with a drain port, according to the invention, the pressure port and the drain port are provided in the body, the pressure port has a branch to the bottom chambers, and the aperture in the side wall is in each of the plungers disposed at the end face opposite to that brought into the operative engagement with the union.

A separate fluid feed into the bottom chamber and into the plunger hollows through a branched port provided in the body obviates the need for check valves in the plungers, which complicate the device and impair its dependability.

In a modification of the automatic coupling device, the drain port provided in the body also has a branch to the bottom chambers, each branch communicating with the chambers via an intermediate chamber containing a ball to alternately block the branches.

Such a modification provides a symmetrical connection of the device to the pressure line.

In another modification, a spring-loaded valve is interposed between the pressure port in the body and the pressure port branch, and a spring-loaded rod is built into the body parallel to the plungers axes; the rod partly extends out of the body, passing through the pressure port, and carries in the pressure port a thrust member which periodically interacts with the spring-loaded valve, the effort of whose spring is less than that of the thrust member spring.

This modification of the device is most expedient when the tractor hydraulic system is connected with that of a hoisting means, i.e. when more stringent safety precautions should be observed, since the provision of the valve, as mentioned above, prevents a self-disconnection of the tractor and tractor-drawn means hydraulic systems.

BRIEF DESCRIPTION OF THE DRAWINGS

The invention will now be explained by a description of particular embodiments thereof with reference to the accompanying drawings, in which.

DETAILED DESCRIPTION OF THE INVENTION

Figure 1:
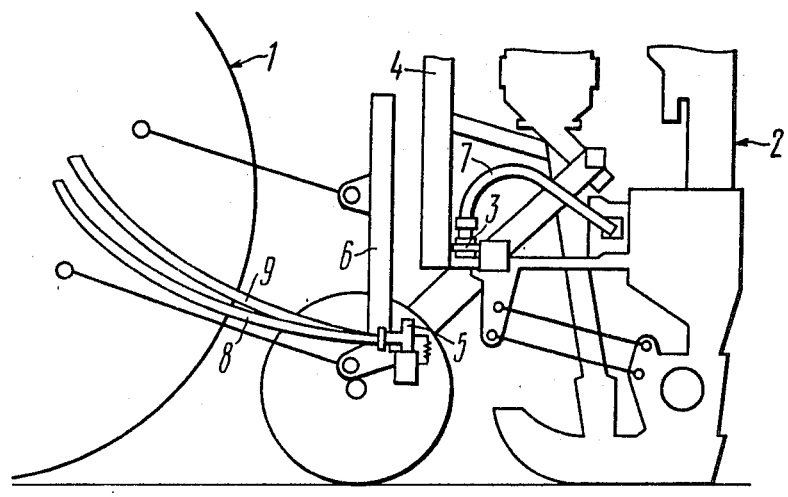
FIG. 1 is a diagrammatic view of the automatic coupling device of the invention with the automatic coupler between the tractor and the tractor-drawn means disengaged.
Figure 2:
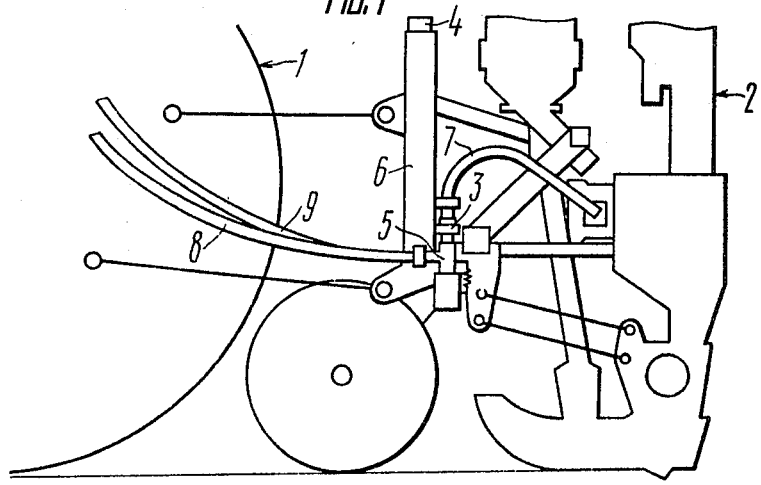
FIG. 2 shows the same as in FIG. 1, but with the automatic coupler between the tractor and the tractor-drawn means engaged.

Referring to FIGS. 1, 2, an automatic coupling device to connect the hydraulic systems of a tractor 1 and of a tractor-drawn means 2 comprises a panel 3 mounted on a lock 4 of an automatic coupler of the tractor-drawn means 2 and a body 5 mounted on a mating part 6 of the automatic coupler lock 4, secured to the tractor 1. The panel 3 is via lines 7 connected to the hydraulic system of the tractor-drawn means, and the body 5, via a pressure line 8 and a drain line 9, to the hydraulic system of the tractor 1.

Figure 3:
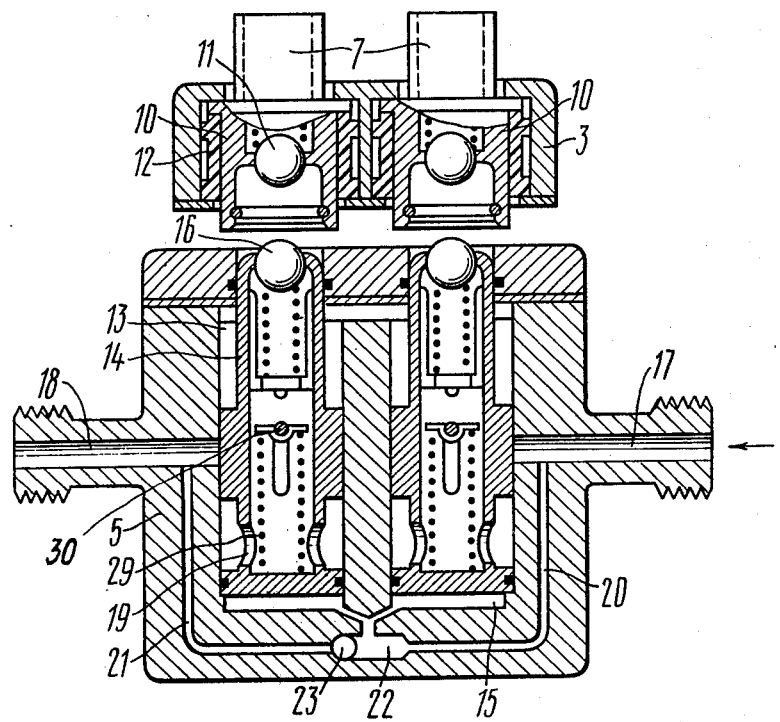
FIG. 3 is a diagrammatic view of a modification of the coupling device of the invention with a branch in the body from the drain port, in the inoperative position.

The panel 3 incorporates built-in receiving unions 10 (FIG. 3) fitted with shut-off ball valves 11. To allow for manufacturing inaccuracies and misalignment of the two parts of the device, the receiving unions 10 are secured in the panel 3 by means of resilient bushings 12. The lines 7 are connected to the unions 10.

The body 5 has at least two blind cylindrical bores 13 accommodating hollow plungers 14. Each plunger 14 defines a bottom chamber 15 in the corresponding bore 13, the bottom chambers 15 being intercommunicated. The end faces of the plungers 14, to be brought into an operative engagement with the respective unions 10, carry shut-off ball valves 16. The body 5 has a pressure port 17 and a drain port 18 for connection with the respective lines 8, 9 of the hydraulic system of the tractor 1.

The side wall of each of the plungers 14 has, at the plunger end face opposite to that to be brought into the operative engagement with the union 10, an aperture 19 to communicate the hollows of the plungers via the ports 17, 18 with the lines 8, 9.

A branch 20 from the pressure port 17 to the intercommunicating bottom chambers 15 is also provided in the body 5.

Figure 4:
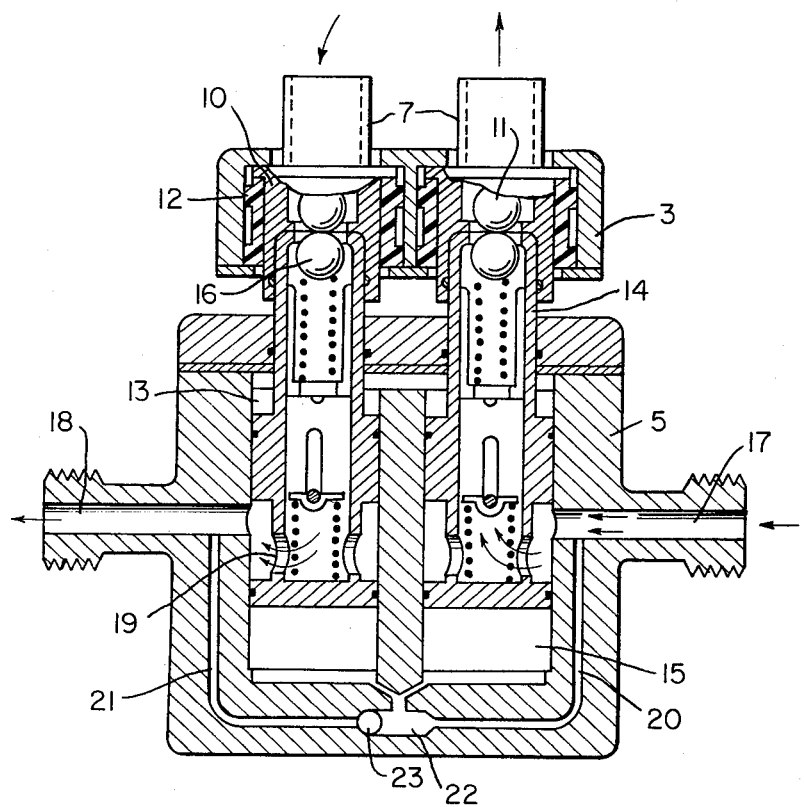
FIG. 4 shows the same as in FIG. 3, but in the working position.
Figure 5:
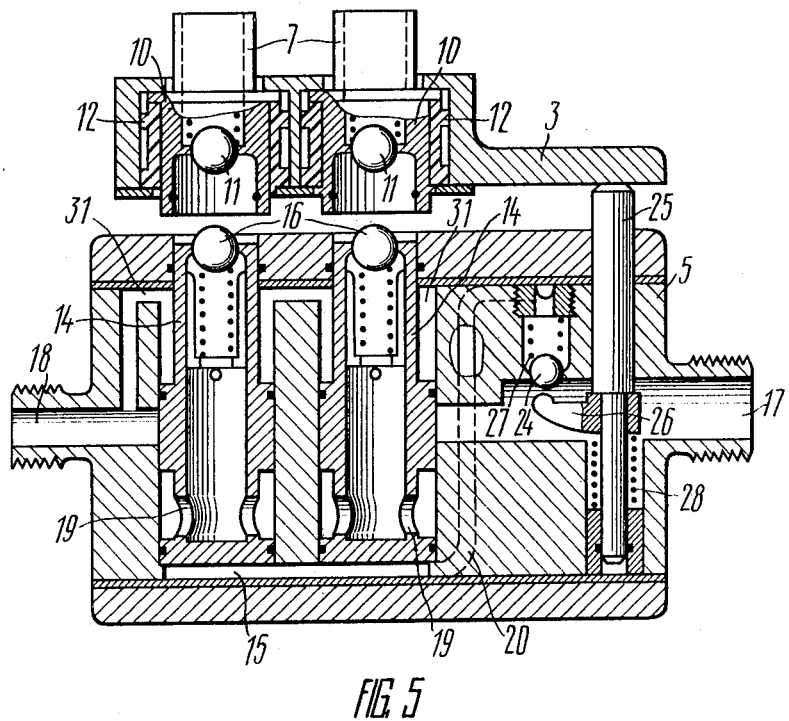
FIG. 5 is a diagrammatic view of a modification of the coupling device of the invention with a controlled valve, in the initial position.
Figure 6:
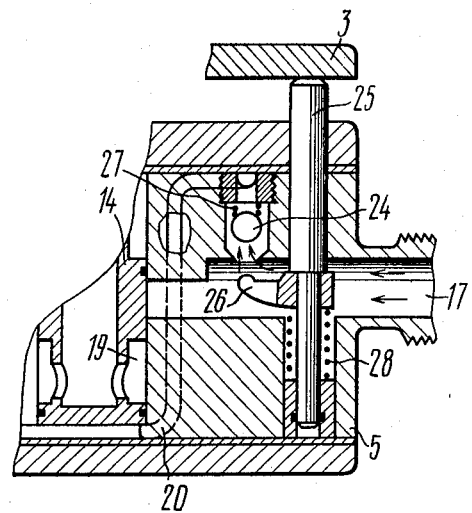
FIG. 6 is a fragmentary view of the coupling device of FIG. 5 at the moment of fluid feed from the pressure line.
Figure 8:
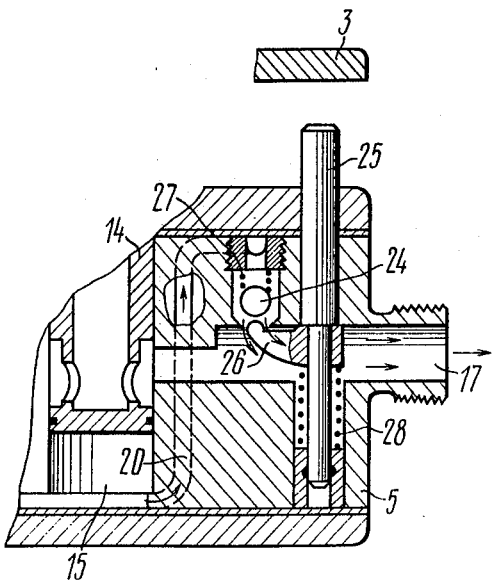
FIG. 8 shows the same as in FIG. 5, but at the moment of disengagement of the automatic coupler between the tractor and the tractor-drawn means and fluid feed into the top chamber.

In a modification of the coupling device (FIGS. 3, 4), the drain port 18 has a branch 21 to the bottom chambers 15 in order to provide a symmetrical connection of the device to the pressure line 8. Both branches, 20 and 21, communicate with the bottom chambers 15 via an intermediate chamber 22 which houses a ball 23 to alternately block the branches 20 and 21.

This provision greatly simplifies operation of the device and enhances its operational dependability.

In another modification of the coupling device, a spring-loaded valve 24 (FIGS. 5-8) is interposed between the pressure port 17 in the body 5 and the branch 20 of the port 17, and a spring-loaded rod 25 is built into the body 5 parallel to the axes of the plungers 14; the rod 25 passes through the pressure port 17, and a portion of the rod 25 extends out of the body 5. In the pressure port 17, the rod 25 carries a thrust member 26 which periodically interacts with the spring-loaded valve 24; the effort of a spring 27 of the valve 24 must be less than that of a spring 28 of the thrust piece 26.

This modification prevents a self-disconnection of the hydraulic systems of the tractor 1 and of the tractor-drawn means 2 in the event of an accidental fluid pressure drop.

To return the plungers 14 to the initial position, the automatic coupling device may, for example, incorporate springs 29 (FIGS. 3, 4) each of which is mounted into one of the respective plungers 14 and fixed by one end in the body 5 with the aid of a stud 30, and by the other end, in the head of the plunger 14, or be provided with top chambers 31 (FIGS. 5, 7) disposed above the plungers 14 and communicating with the drain port 18.

The propsed automatic coupling device functions as follows.

The tractor 1 is brought in reverse to the tractor-drawn means 2 placed on a level ground. The two automatic coupler parts 4, 6 (see FIGS. 1, 2) engage each other, with the result that the panel 3 and the body 5 of the device are disposed in the predetermined spaced coaxial relationship to each other. To couple them, the driver of the tractor 1 turns on the hydraulic system pressure line, and fluid is via the pressure port 17 and the branch 20 (see FIG. 3) admitted into the interconnecting bottom chambers 15.

In the modification with the intermediate chamber 22 and the branch 20, the ball 23 blocks either the branch 20 or the branch 21, depending on into which of the ports, 17 or 18, fluid is delivered. From the intermediate chamber 22, fluid flows into the bottom chambers 15.

The fluid pressure causes the plungers 14 (see FIG. 4) to move in the bores 13 in the body 5 until their valves 16 operatively engage the valves 11 of the receiving unions 10. Having come into the operative engagement, the valves 16, 11 open one another, and the apertures 19 in the side walls of the plugners register with the pressure port 17 and the drain port 18. Fluid from the pressure line 8 passes via the pressure port 17, the aperture 19 in the side wall of one of the plungers 14, the hollow of the latter, and the corresponding open valves 16, 11 into the hydraulic system of the tractor-drawn means 2.

To disconnect the hydraulic systems of the tractor and the tractor-drawn means, the driver simply turns off the fluid pressure in the pressure line 8, and the plungers 14 under the action of the springs 29 return to the initial position, forcing fluid out of the bottom chamber 15.

In another modification of the automatic coupling device, at the moment when the automatic coupler engages, the rod 25 (see FIG. 5), interacting by its extending portion with the panel 3, means jointly with the thrust member 26 down and thus releases the valve 24, which comes to the initial position. When fluid is fed into the pressure port 17, the fluid pressure causes the valve 24 to open, and fluid is via the branch 20 admitted into the bottom chambers 15 (see FIG. 6), following which the operation of the device proceeds in the same manner as described above.

Figure 7:
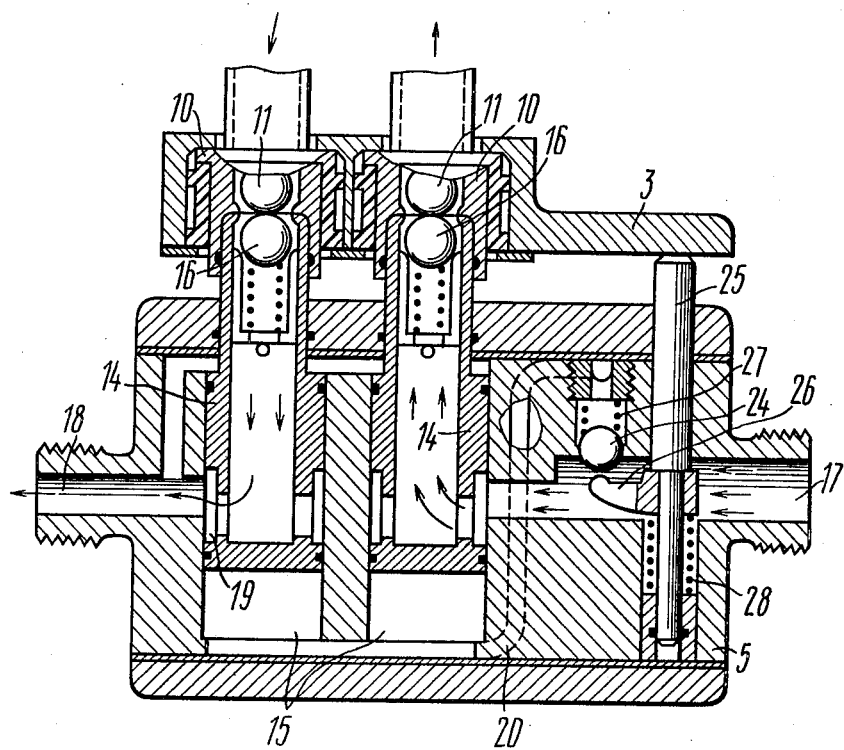
FIG. 7 shows the same as in FIG. 5, but in the working position.

After the plungers 14 have come into the operative engagement with the receiving unions 10 and the side apertures of the plungers have registered with the pressure port 17 and the drain port 18, the fluid pressure in all the ports, branches, and chambers equalizes, and the vlave 24 closes (returns to the initial position as shown in FIG. 7).

In the event of an accidental fluid pressure drop, the closed valve 24 prevents fluid from passing out of the bottom chambers 15 and thereby precludes a self-disconnection of the hydraulic systems of the tractor 1 and the tractor-drawn means 2. This feature is of particular importance when the tractor hydraulic system is connected with that of, for example, a self-contained loader of a trailer.

Used fluid from the hydraulic system of the tractor-drawn means passes via another receiving union 10 in the panel 3, the corresponding plunger 14, and further into the drain port 18.

Disconnection of the hydraulic systems of the tractor and the tractor-drawn means is accomplished semi-automatically. For this purpose, the automatic coupler parts are disengaged, which releases the end of the rod 25; acted upon by the spring, the rod 25 moves up, and the thrust member 26 opens the valve 24. Thereupon, the pressure line 8 is connected to the drain port 18 of the device, and fluid flows into the top chambers 31 to force the plungers 14 to the initial position; fluid from the bottom chambers 15 freely flows via the branch 20, the open valve 24, and the pressure port 17 (see FIG. 8). It will be apparent that the plungers 14 may also be returned to the initial position in the same manner as in the preceding modification.

While only some particular embodiments of the invention have been shown and described, various modifications thereof will be apparent to those skilled in the art, and therefore it is not intended that the invention be limited to the disclosed embodiments or to the details thereof, and departures may be made therefrom within the spirit and scope of the invention as defined in the claims.

What is claimed is:

1. An automatic coupling device for connecting a hydraulic system of a tractor and a hydraulic system of a tractor-drawn device comprising:
    a panel secured on said tractor-drawn device;
    receiving unions accommodated in said panel and connected with said hydraulic system of said tractor-drawn device;
    first shut-off valves built into said receiving unions for controlling fluid flow through said receiving unions;
    a body secured on said tractor;
    hollow plungers movably mounted in blind bores in said body, the number of said plungers being equal to that of said receiving unions and said plungers having first end faces movable into positions operatively engaging said receiving unions;
    second shut-off valves disposed in the plungers at the first end faces operatively engaging said unions;
    bottom chambers defined by said hollow plungers in each of said bores, said bottom chambers intercommunicating with each other;
    a pressure port provided in the body for connection to the tractor hydraulic system;
    a branch provided in said body and extending from said pressure port to said bottom chambers for furnishing fluid under pressure to said bottom chambers, such fluid moving said hollow plungers with respect to said body so that said first end faces enter said receiving unions and said second shut-off valves engage said first shut-off valves whereby said shut-off valves are moved to establish fluid communication between said receiving unions and said plungers;
    a drain port provided in said body for connection to said hydraulic system of said tractor; and
    apertures provided in the side wall of each of said plungers at the end faces opposite to those operatively engaging said unions for communicating the hollows of said plungers with respective ones of said pressure and said drain ports.

2. An automatic coupling device as defined in claim 1, having
    a branch provided in said body from said drain port to said bottom chambers;
    an intermediate chamber provided in said body and communicated with said branches and said bottom chambers; and
    a member housed in said intermediate chamber for alternately blocking the branches.

3. An automatic coupling device as defined in claim 1, having
    a spring-loaded valve disposed in said body between said pressure port and its branch;
    a spring-loaded rod built into said body so that it is disposed parallel to the axes of said plungers, passes through said pressure port, and partly extends out of said body;
    a spring-loaded thrust member disposed in said pressure port on said rod and periodically interacting with said spring-loaded valve, the force of the valve spring being less than that of the thrust member spring.

4. An automatic coupling device for connecting a first hydraulic system to a second hydraulic system, said coupling device comprising:
    a panel connectable in a fixed position to structure supporting the second hydraulic system;
    receiving unions accommodated in said panel in fluid communication with said second hydraulic system;
    first shut-off valve means accommodated in said receiving means for controlling fluid flow through said receiving units, said first shut-off valve means being movable between blocking positions blocking fluid flow through said receiving unions and non-blocking positions permitting fluid flow;
    means for urging said first shut-off valve means into said blocking positions;
    a body connectable in a fixed position to structure supporting the first hydraulic system and having blind bores;
    hollow plungers movably mounted in said blind bores, said hollow plungers being movable into extended positions in which first end faces thereof are received in said receiving unions;

second shut-off valve means accommodated in said first end faces for controlling fluid flow through said first end faces, said first and second shut-off valve means being movable by each other so as to permit fluid flow between said hollow plungers and said receiving unions;

interconnected bottom chambers defined in said body between second end faces of said hollow chambers and bottoms of said blind bores;

a pressure port provided in said body connectable to said first hydraulic system for establishing communication between one of said blind bores and said first hydraulic system, the plunger disposed in said one blind bore having an aperture in a side wall thereof for communicating the interior of said plunger with said first hydraulic system;

a passage formed in said body for establishing fluid communication between said bottom chambers and said pressure port so that pressure from said first hydraulic system is fed into said bottom chambers to move said hollow plungers into said extended positions; and a drain port provided in said body connectable to said first hydraulic system for establishing fluid communication between a second of said blind bores and said first hydraulic system, the plunger disposed in said second blind bore having an aperture in a side wall thereof for communicating the interior thereof with said first hydraulic system.

* * * * *